United States Patent [19]
Iceland

[11] Patent Number: 5,245,546
[45] Date of Patent: Sep. 14, 1993

[54] WELDING ARC LENGTH CONTROL SYSTEM

[75] Inventor: William F. Iceland, Los Alamitos, Calif.

[73] Assignee: Rockwell International Corporation, Seal Beach, Calif.

[21] Appl. No.: 767,609

[22] Filed: Sep. 30, 1991

[51] Int. Cl.⁵ .............................................. G06F 15/46
[52] U.S. Cl. ................................ 364/477; 219/130.33; 219/121.3
[58] Field of Search ...................... 364/477; 219/86.41, 219/86.33, 86.25, 86.1, 110, 121.28, 121.30, 121.31, 121.32, 121.34, 122, 124.02, 124.1, 130.1–130.51

[56] References Cited
U.S. PATENT DOCUMENTS

| | | | |
|---|---|---|---|
| 4,024,371 | 5/1977 | Drake | 364/477 |
| 4,376,884 | 3/1983 | Gold et al. | 219/86.41 |
| 4,447,699 | 5/1984 | Gold et al. | 219/110 |
| 4,561,059 | 12/1985 | Doris et al. | 364/477 |
| 5,149,933 | 9/1992 | Donner | 219/110 |
| 5,157,236 | 10/1992 | Batzler et al. | 219/130.51 |

Primary Examiner—Jerry Smith
Assistant Examiner—Jim Trammell
Attorney, Agent, or Firm—Lawrence N. Ginsberg; Charles T. Silberberg

[57] ABSTRACT

The present invention is a welding arc length control system. The system includes, in its broadest aspects, a power source for providing welding current, a power amplification system, a motorized welding torch assembly connected to the power amplification system, a computer, and current pick up means. The computer is connected to the power amplification system for storing and processing arc weld current parameters and non-linear voltage-ampere characteristics. The current pick up means is connected to the power source and to the welding torch assembly for providing weld current data to the computer. Thus, the desired arc length is maintained as the welding current is varied during operation, maintaining consistent weld penetration.

12 Claims, 3 Drawing Sheets

WELDING ARC LENGTH CONTROL SYSTEM

STATEMENT OF GOVERNMENT INTEREST

This invention was made with Government support under Contract No. NAS9-14000 awarded by NASA. The Government has certain rights in this invention.

BACKGROUND OF THE INVENTION

1. Field of the Invention

This invention relates to arc length control of welding systems and, more particularly to computerized arc length control for processing arc weld current parameters and non-linear voltage-ampere characteristics to maintain the desired arc length.

2. Description of the Related Art

Control of arc length in commercial automatic welding systems is typically accomplished by a motorized servo system with arc length proportional to arc voltage. Arc length is maintained constant by a motorized weld torch driven from a differential output derived from comparing the arc voltage to a standard voltage. However, this methodology is problematic because the voltage characteristics for a constant arc length during a changing current is a non-linear function. Therefore, in a motorized system the desired arc length is not maintained during arc current variations. Generally, for maintaining a constant arc length, the arc current has been maintained constant. As will be disclosed below, the present invention provides maintenance of the constant arc length with variable arc current.

OBJECTS AND SUMMARY OF THE INVENTION

It is therefore a principal object of the present invention to overcome the non-linear, voltage-ampere characteristics of the welding arc.

It is another object of the present invention to store and recall arc voltage-ampere characteristics data from a computer memory.

Another object of the present invention is to use a differential voltage to maintain constant arc length characteristics.

These and other objects are achieved by the present invention which is a welding arc length control system. The system includes, in its broadest aspects, a power source for providing welding current, a power amplification system, a motorized welding torch assembly connected to the power amplification system, a computer, and current pick up means. The computer is connected to the power amplification system for storing and processing arc weld current parameters and non-linear voltage-ampere characteristics. The current pick up means is connected to the power source and through the work to the welding torch assembly for providing weld current data to the computer. Thus, the desired arc length is maintained as the welding current is varied during operation, maintaining consistent weld penetration.

The present invention may be used in both automatic and manual welding contexts. For constant arc voltage control, the weld torch is conventionally in a locked position to prevent a variation in arc length as the weld current is changed. The present invention eliminates this requirement.

As applied to a motorized manual welding system, the present invention obviates the requirement for the great skill required by weldors in maintaining a constant arc length during manual manipulation of the arc.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENT

Figure 1:
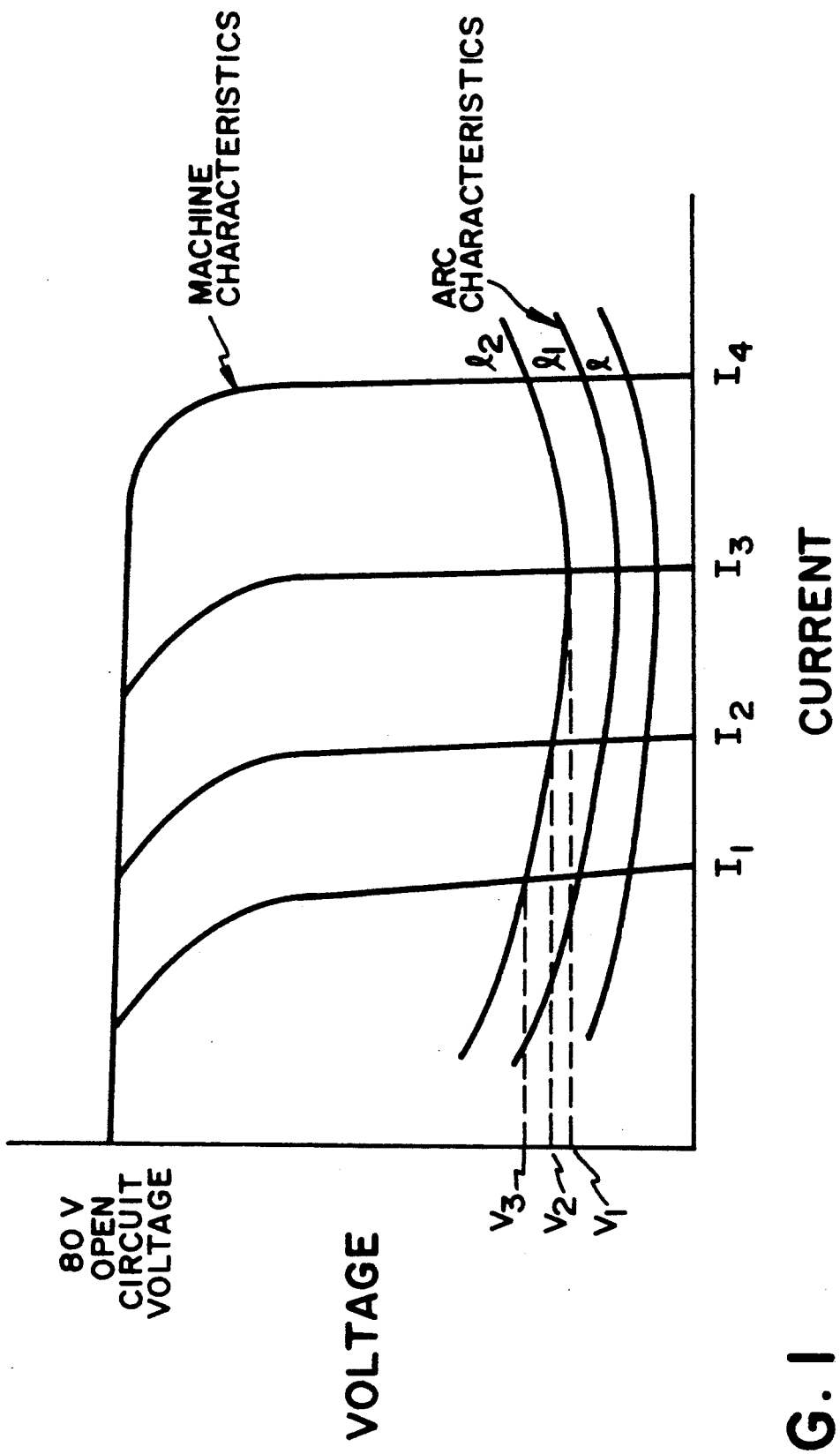
FIG. 1 is a generalized plot of voltage versus current, illustrating the non-linear voltage-ampere characteristics of gas tungsten arc welding.

Referring to the drawings and the characters of reference marked thereon, FIG. 1 illustrates the arc characteristics of three different generalized arc lengths, labelled l, $l_1$ and $l_2$. Arc length $l_2$ is greater than arc length $l_1$ which is greater than arc length l. Superimposed on the arc characteristics curves are machine constant current characteristics, where $I_4$ is greater than $I_3$, $I_3$ is greater than $I_2$, and $I_2$ is greater than $I_1$. A typical safe open circuit voltage of the weld machine was selected to be 80 volts.

For a specific arc length $l_2$ during welding the current is $I_3$ and the voltage is $V_1$, respectively. For the same arc length $l_2$, as the current is decreased to $I_2$ the voltage is increased to $V_2$. For the same arc length $l_2$ as the current is further decreased to $I_1$ the voltage is increased to $V_3$.

In a conventional closed loop motorized control system the change in current shown above will increase the arc voltage which, in turn, will drive the arc length to a shorter distance. This is a very undesirable condition. The present invention overcomes the changes in arc voltage as the arc current is varied.

Figure 2:
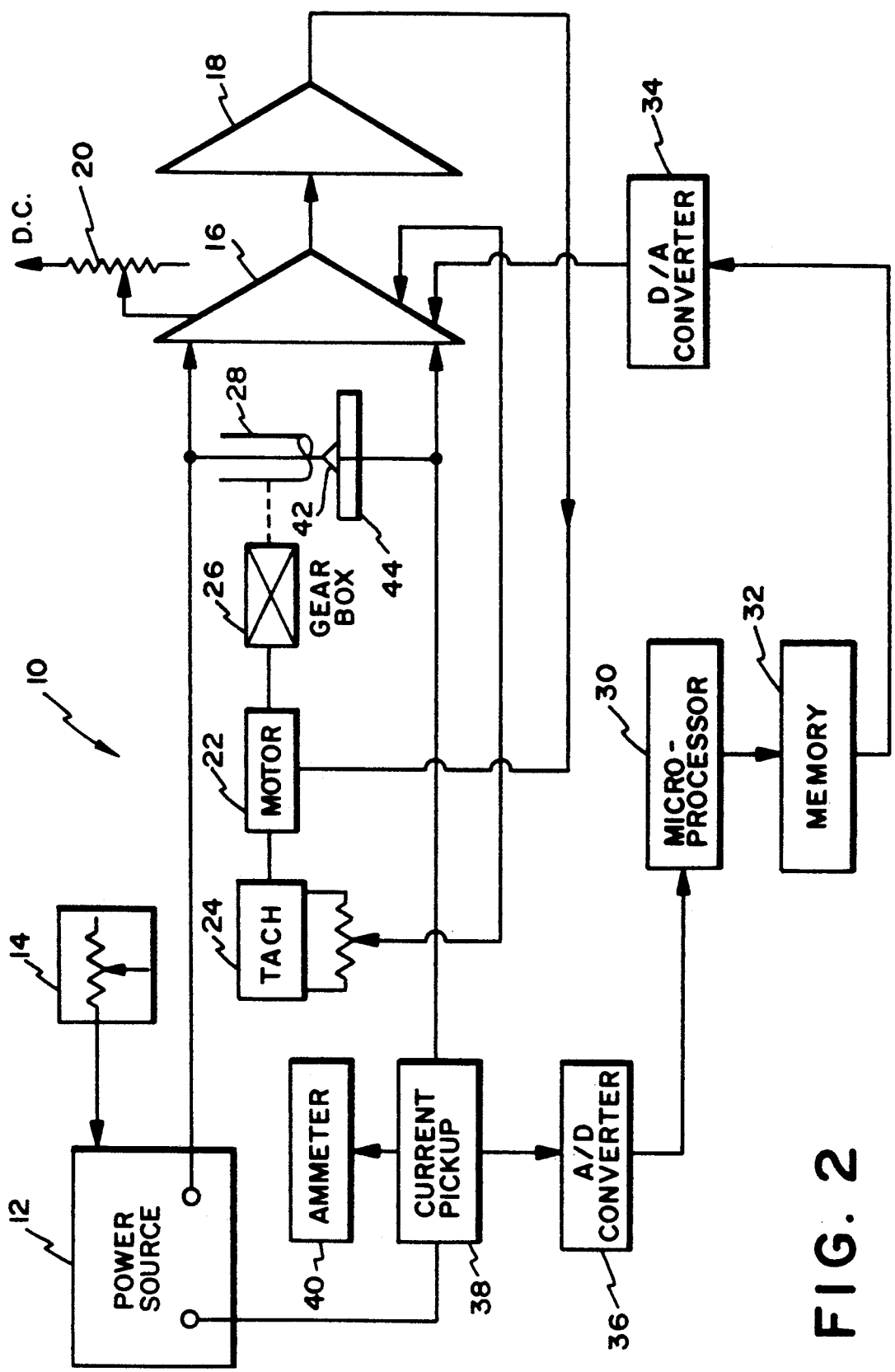
FIG. 2 is a schematic illustration of the welding arc length control system of the present invention.

Referring now to FIG. 2, the welding arc length control system of the present invention is illustrated, designated generally as 10. A power source 12 is utilized for providing the desired welding current. The power source 12 may be DC or an AC power supply. It may be a constant current or drooping characteristic power supply. The power supply is controlled by a potentiometer 14 which may comprise a foot switch or hand control. A power amplification system, including a differential amplifier 16 and a power amplifier 18, is connected to the welding power source 12. A separate power supply, through a potentiometer 20, is provided for injecting a comparison voltage to the differential amplifier 16 for maintaining a constant arc length. The comparison voltage is compared to the arc voltage in the differential amplifier 16. The output of the differential amplifier 16 drives the power amplifier 18 driving a torch motor 22 of a welding torch assembly until the arc voltage is equal to the comparison voltage. This sets the arc length of the system 10.

The motorized welding torch assembly includes a tachometer 24 which provides critical dampening to the servo system. A planetary gear box 26 associated with the motor 22, and connected to the torch 28, sets the rate of response of the system. The torch 28 may be a plasma arc welding torch or a gas tungsten arc welding torch.

A computer system is connected to the power amplification system for storing and processing arc weld current parameters and non-linear, voltage-ampere characteristics of the arc. The computer system includes a micro-processor 30, memory device 32, digital-to-analog converter 34 and an analog-to-digital converter 36. The non-linear characteristics stored in memory 32 is converted from digital to analog data in converter 34 and impressed in the differential amplifier 16. A current pick up device 38 is utilized to sense weld current change. The weld current is converted to digital data through converter 36. The micro-processor 30 changes the stored memory volt-ampere characteristics to the desired error output. This error is impressed through the differential amplifier 16, adding or subtracting to the comparison voltage 20. This addition or subtraction to the comparison voltage maintains the required balance to the arc voltage to maintain a constant system arc length. (An ammeter 40 is provided for current identification.)

The welding arc 42 is established to workpiece 44 through torch 28 and current pick up device 38 from the power source 12. The weld torch 28 is supplied with an inert gas such as helium, argon and/or gas mixtures thereof to prevent oxidation of the workpiece during welding.

Figure 3:
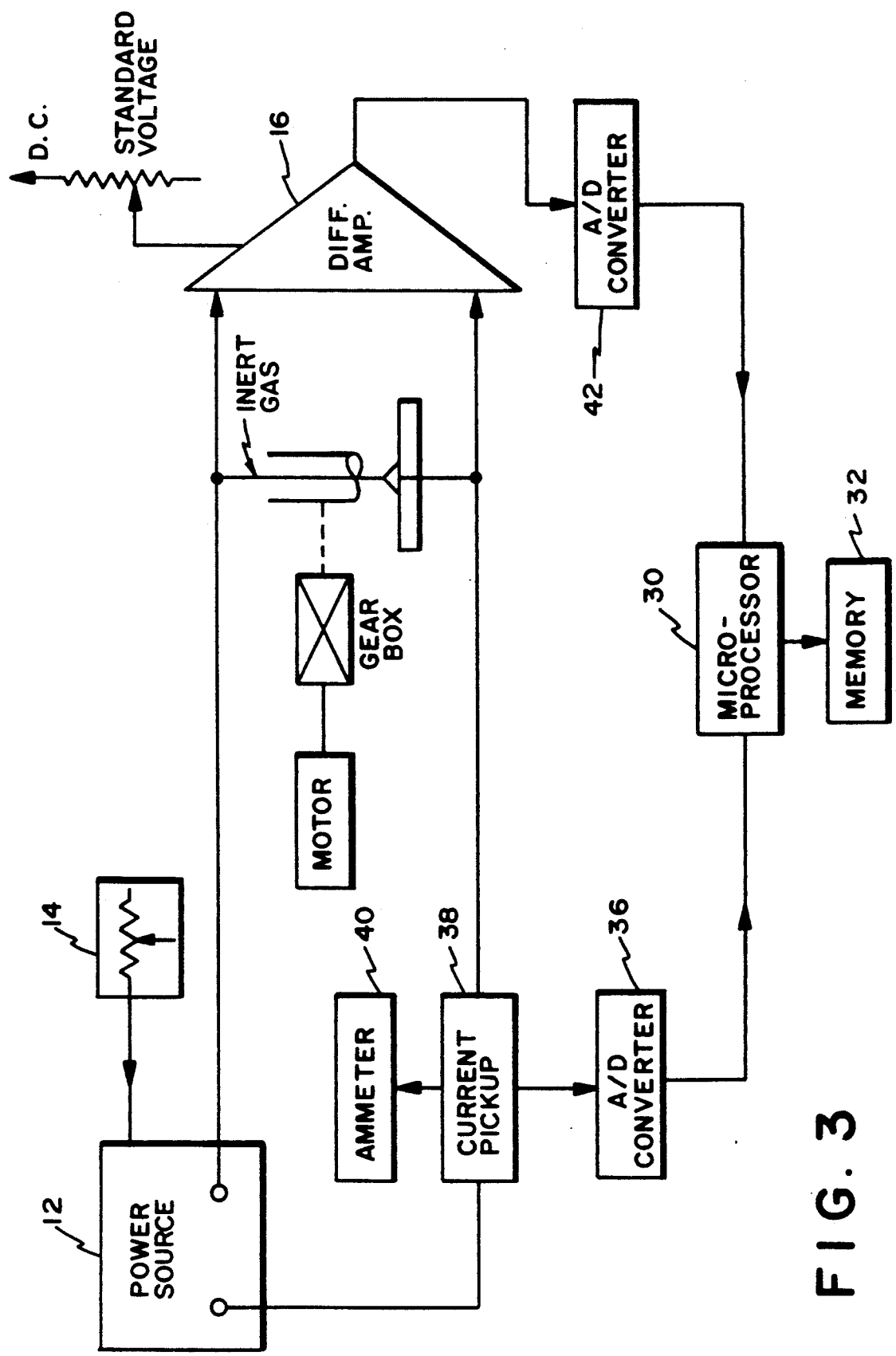
FIG. 3 is a schematic illustration of a memory input control circuit which may be utilized to input the volt-ampere characteristics for use with the present invention.

Referring now to FIG. 3, one method of loading the memory with the volt-ampere characteristics will now be described. Using a fixed arc length (mechanically locked torch), an arc is established. The arc current is sensed through the current pick up 38 and the arc voltage is impressed into the differential amplifier 16. The differential voltage output and current signals are converted to digital information via analog-to-digital converter 36 and a second analog-to-digital converter 42. The data is processed through the micro-processor 30 and stored in memory 32. The weld current is then varied by the foot switch current control 14 and the resulting differential amplifier output voltage (delta arc voltage) and weld current outputs are again converted to digital signals through the analog-to-digital converters 36, 42. This data is stored in the memory 32. The process is repeated for other arc lengths and gas mixtures.

Referring again now to FIG. 2, the constant arc length closed loop system, complete with the weld current delta arc voltage stored in the memory, is added to the motorized servo control system 10. First, the weld torch 28 is unlocked from a fixed position and the arc is then initiated. The arc voltage is compared to the comparison voltage 20 in the differential amplifier 16. The servo motor 22 positions the arc for the required arc length from the summation of these two voltages. As the current through the arc is varied by the operator through potentiometer 14, the current pick up 38 applies the current information to the micro-processor 30. In turn, the memory delta arc voltage from memory 32 is directed into the differential amplifier 16. All the control voltages (from the arc, comparison voltage, and delta arc voltage) are then acted on by the differential amplifier 16. The summation output through the servo loop maintains the arc length constant as the operator varies the weld current.

If the voltage ampere characteristics for a specific inert gas or gas mixture are known, this data may be input directly into the micro-processor.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A motorized welding arc length control system, comprising:
   a) a power source for providing welding arc current;
   b) a power amplification system connected to said power source, said power amplification system comprising
      i) a differential amplifier;
      ii) a power amplifier connected to the output of said differential amplifier; and
      iii) means for injecting a comparison and memory voltage to said differential amplifier, the resulting differential amplifier output voltage being a delta arc voltage;
   c) a motorized welding torch assembly connected to said power amplification system;
   d) a computer connected to said power amplification system for storing and processing arc weld current parameters and non-linear, voltage-ampere characteristics in memory; and
   e) current pick up means connected to said power source and to said welding torch assembly for providing weld current data to said computer
      wherein, for specific arc lengths, said arc current is sensed through said current pick up means and is impressed into said memory; similarly, a corresponding delta arc voltage is impressed into said memory, thereby providing stored arc current data and stored delta arc voltage data; and,
      wherein during the welding procedure when the operator varies said arc current for a desired penetration, said current pick up means provides arc current information to said computer, said computer using said arc current information, said stored arc current data and said stored delta arc voltage data, directs said stored delta arc voltage into said differential amplifier, a summation output from said differential amplifier being directed through a servoloop to maintain the arc length substantially constant as the operator varies the welding arc current, thereby maintaining a consistent weld penetration.

2. The welding arc length control system of claim 1, wherein said power source comprises a D.C. power supply.

3. The welding arc length control system of claim 2, wherein said D.C. power supply comprises a constant current power supply.

4. The welding arc length control system of claim 2, wherein said D.C. power supply comprises a drooping characteristic power supply.

5. The welding arc length control system of claim 1, wherein said power source comprises an A.C. power supply.

6. The welding arc length control system of claim 1, wherein said current pick up means comprises A.C. current pick up means.

7. The welding arc length control system of claim 1, wherein said current pick up means comprises D.C. current pick up means.

8. The welding arc length control system of claim 1, wherein said computer includes an analog-to-digital converter and a digital-to-analog converter for providing memory, storage and read-out capabilities.

9. The welding arc length control system of claim 1, wherein said welding torch assembly comprises a gas tungsten arc torch assembly.

10. The welding arc length control system of claim 1, wherein said welding torch assembly comprises a plasma torch assembly.

11. The welding arc length control system of claim 1, wherein said motorized welding torch assembly includes a motorized manual welding torch.

12. The welding arc length control system of claim 1, wherein said motorized welding torch assembly includes an automatic motorized welding torch.

* * * * *